Figure 3:
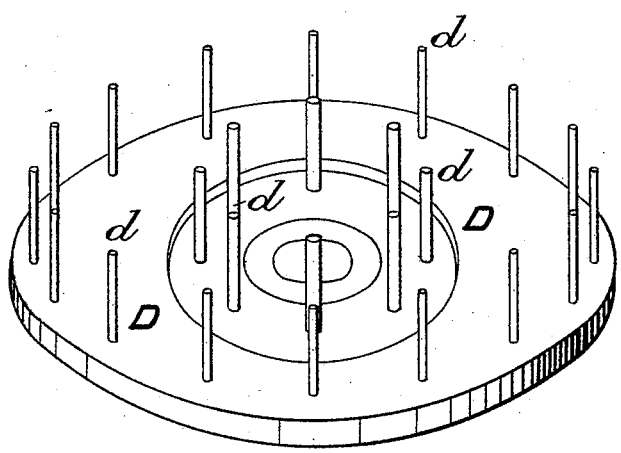

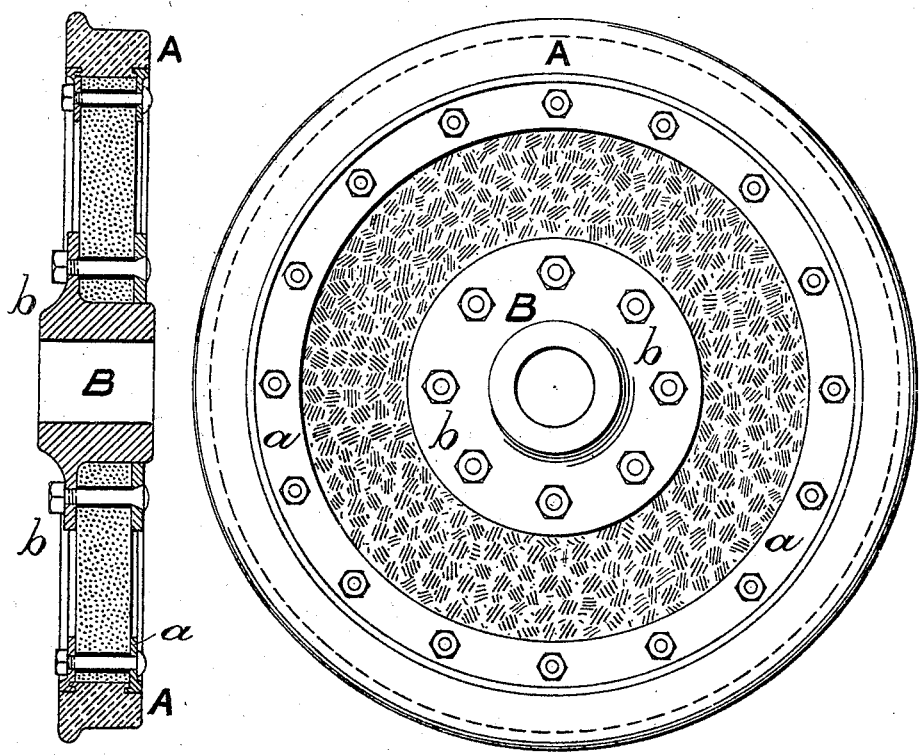

No. 795,683. PATENTED JULY 25, 1905.
S. G. BOARD.
WHEEL FOR RAILWAY, TRAMWAY, AND OTHER VEHICLES, &c.
APPLICATION FILED MAY 24, 1904.

2 SHEETS—SHEET 2.

WITNESSES. INVENTOR.

UNITED STATES PATENT OFFICE.

SAMUEL GEORGE BOARD, OF MANCHESTER, ENGLAND.

WHEEL FOR RAILWAY, TRAMWAY, AND OTHER VEHICLES, &c.

No. 795,683.　　　Specification of Letters Patent.　　　Patented July 25, 1905.

Application filed May 24, 1904. Serial No. 209,601.

*To all whom it may concern:*

Be it known that I, SAMUEL GEORGE BOARD, a British subject, and a resident of Manchester, in the county of Lancaster, England, have invented certain new and useful Improvements in Wheels for Railway, Tramway, and other Vehicles and in Wheels or Pulleys for other Purposes, of which the following is a specification.

It has hitherto been the practice to prepare disks or centers of wheels of wood or of a pulp or of a compound or prepared material and upon the disks so formed to shrink the tires or rims and fit in the hubs. It has also been proposed to secure the rims on such disks by flanged plates shrunk into grooves in the rim and also to fill a prepared material in a soft dry state into the rim and subject it to impact from numerous blows of a steam-hammer until the requisite degree of solidity and strength has been produced. It is now found, however, that a much better wheel structure can be obtained, together with economy in manufacture, from a mixture or compound of wood sawdust, magnesium oxid, magnesium chlorid, or hydrochlorid acid, and farina or other ingredients by compressing the material while in a soft, plastic, and moist condition direct into the rim or tire and upon the hub or center by a dead hydraulic pressure exerted equally over the entire surface thereof.

The invention will be fully described with reference to the accompanying drawings.

Figure 1 is a side elevation of railway-wheel constructed in accordance with the invention; Fig. 2, a sectional elevation of same; Fig. 3, a perspective view of plate for molding same.

The rim or tire A for the wheel and the hub B are first constructed in the ordinary way as for disk wheels. A die-plate D is also constructed to accurately fit the interior of the tire with a number of projecting studs $d$, each of which corresponds to a bolt-hole to be formed in the wheel center for the hub-flange $b$ and the rim-plates $a$. A second die-plate is fitted over the plate D, with holes through which the studs $d$ project.

The hub B is placed in the center of the die-plate D and the tire or rim A around it upon a suitable bed plate or block. The prepared material in a soft, plastic, and moist condition is filled into the interior of the rim or tire A upon the die-plate D, between the tire and the hub, and the second plate placed on top. On the ends of the studs $d$, projecting through the second plate, nuts are screwed. The die-plate D, with the hub and tire, are placed in a suitable hydraulic or other press, and the prepared material is compressed at a dead pressure of, say, about two tons per square inch into the space between the interior of the tire and the hub, the pressure being applied equally over the entire surface. When the material is compressed and before the pressure is relieved, the nuts are screwed down upon the second plate, so that when compressed to the desired extent the material is prevented expanding after the pressure is relieved and while it is drying. After compression the wheel is removed from the press and the material dried before removing the die-plates.

Ferrules or tubes are preferably placed upon the studs $d$ to form the bolt-holes, so that there may be no difficulty in removing the die-plate D and studs $d$ after compression.

Should it be considered necessary in order to prevent any slipping between the rim or tire or hub and the center material, indentations or projections may be formed thereon into or around which the material will be compressed.

The center may be compressed within the tire without being compressed around a metal hub, either solid or with a hole to receive a hub.

The tire or rim and the hub may be joined by bars or spokes over or around which the plastic material may be compressed, which would effectually prevent any displacement of the parts relatively to one another.

For common road-vehicles or other wheels with spokes the mold or die-box is made of a shape to mold the hub-fellies and spokes inside a rim or tire either with or without a metal bush inserted or joined for the axle of the wheel, or a disk may be molded between the hub and felly instead of the spokes. Any other form of wheel with a metal rim or tire may be made in the same way, molded or compressed within the tire, and may be employed for wheels or pulleys for other purposes than vehicles.

What I claim as my invention, and desire to protect by Letters Patent, is—

1. In a wheel applicable for railway and other vehicles a composition of sawdust, magnesium oxid, and magnesium chlorid a tire and a central hub into and around which the composition is, while in a soft, moist and plastic state, compressed and held therein under a dead hydraulic pressure over the whole surface until it dries and sets substantially as described.

2. A wheel comprising in its construction a tire, a hub and a disk of soft plastic material of sawdust, magnesium oxid, and magnesium chlorid compressed while in a soft plastic and moist state into the tire and around the hub and maintained therein under a dead hydraulic pressure equal over its entire surface until dry and hard, substantially as described.

3. In a wheel the combination with a tire and a hub of a composition of sawdust magnesium oxid and a binding material compressed while in a soft plastic and moist state into the tire and around the hub by a dead hydraulic pressure equal over its entire surface substantially as described.

4. In a wheel the combination with a tire and a hub of a composition of sawdust, magnesium oxid, and magnesium chlorid, compressed while in a soft plastic and moist state into the tire and around the hub and maintained therein under a dead hydraulic pressure equal over its entire surface until set dry and hard substantially as described.

5. A wheel comprising in its construction a prepared material forced and compressed while in a soft moist plastic condition into the space around the hub and between it and the tire by a dead hydraulic pressure equal over its entire area in combination with the said hub and tire substantially as described.

6. A wheel comprising in its construction a prepared material of sawdust magnesium oxid and a binding material forced and compressed while still in a soft plastic moist condition around the hub and into the space between it and the tire and maintained therein under a dead hydraulic pressure equal over its entire area until set in combination with the said hub and tire substantially as described.

In witness whereof I have hereunto signed my name in the presence of two subscribing witnesses.

SAMUEL GEORGE BOARD

Witnesses:
    J. OWDEN O'BRIEN,
    T. W. ANDREW.